United States Patent [19]

Warner

[11] 4,034,152

[45] July 5, 1977

[54] TERMINATION SYSTEM FOR FUSING ALUMINUM-TYPE LEAD WIRES

[76] Inventor: Allan S. Warner, 50 Haliday St., Clark, N.J. 07066

[22] Filed: Dec. 3, 1975

[21] Appl. No.: 637,253

Related U.S. Application Data

[63] Continuation of Ser. No. 370,679, June 18, 1973, abandoned, which is a continuation of Ser. No. 220,939, Jan. 26, 1972, abandoned.

[52] U.S. Cl. ................................ 174/94 R; 29/628; 219/91; 219/118; 339/275 R; 339/276 F; 403/12; 403/270

[51] Int. Cl.² ................. H01R 43/02; H01R 11/06; B23K 11/18

[58] Field of Search ............. 174/75 R, 84 R, 84 C, 174/90, 94 R; 29/628; 140/112; 219/58, 91, 92, 93, 94, 117 R, 118, 119; 228/904; 339/275 R, 275 A, 275 C, 275 T, 276 F; 403/12, 270, 271

[56] References Cited

UNITED STATES PATENTS

| | | | |
|---|---|---|---|
| 1,390,596 | 9/1921 | Thornton, Jr. | 339/275 A X |
| 2,786,192 | 3/1957 | Woolley, Jr. | 339/276 F |
| 3,051,809 | 8/1962 | Dell | 174/90 X |
| 3,156,514 | 11/1964 | Wing et al. | 339/97 C |

*Primary Examiner*—Laramie E. Askin
*Attorney, Agent, or Firm*—Leitner, Palan & Martin

[57] ABSTRACT

An electrical tang type terminal for use in fusing aluminum or aluminum alloy wire thereto. The terminal includes an enlargement to absorb part of the active electrode pressure during heat and pressure application, thereby peventing shearing or undue weakening of the softened wire. Prior to fusing, the enlargement is spaced from the opposite portion of the tang or body to which it is to be fused to permit localized heating and some wire deformation. During fusing, the enlargement helps control the mechanical pressure on the softened wire.

2 Claims, 12 Drawing Figures

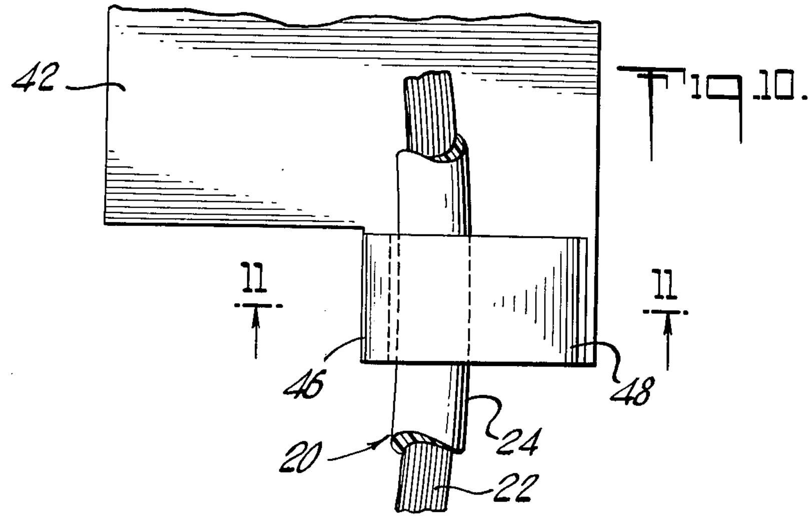
Fig. 10.
Fig. 11.
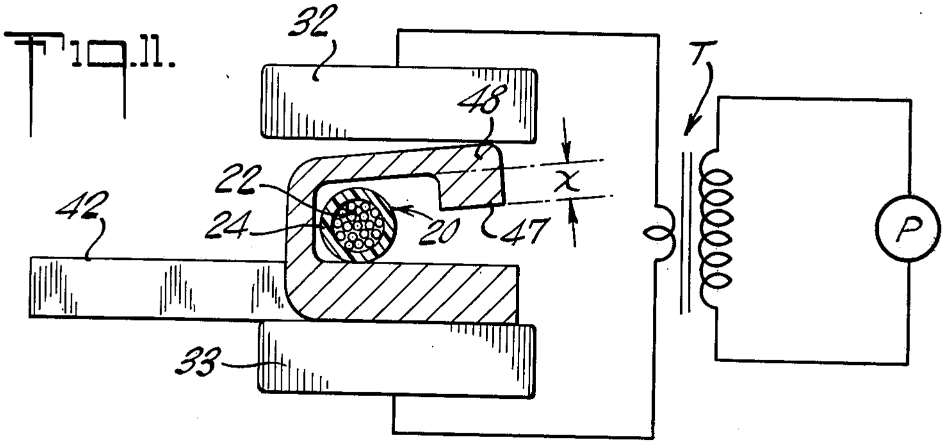
Fig. 12.
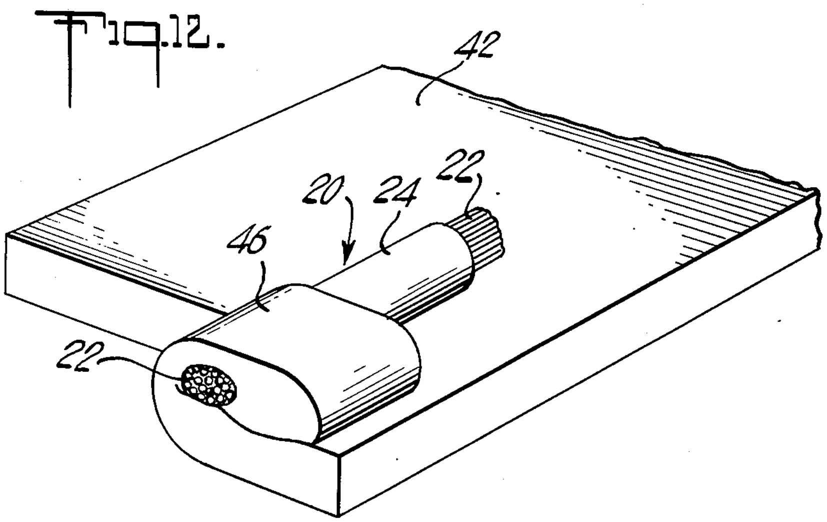

TERMINATION SYSTEM FOR FUSING ALUMINUM-TYPE LEAD WIRES

This application is a continuation of application Ser. No. 370,679, filed June 18, 1973, now abandoned, which in turn is a continuation of application Ser. No. 220,939 filed Jan. 26, 1972, also abandoned.

BACKGROUND OF THE INVENTION

The present invention relates to an electrical termination that facilitates electric resistance fusing of either insulated or uninsulated conductor wire, particularly low melting point wire such as aluminum or aluminum alloy wire.

Conventional techniques have long been known for electrically welding or fusing wire terminations to tang type commutator segments or electrical terminals. In these arrangements a U-shaped tang holds the wire during winding and permits subsequent compression of the tang around the wire between active electrodes. This operation fuses or welds the tang onto the body of the commutator terminal and bonds the wire to the contacting surfaces. At one time, it was customary to mechanically or chemically remove the wire insulation at the location of the weld. However, since the 1950's it has been the practice to fuse or weld the insulated wire and rely on the heat generated during fusing or welding to remove the insulation by flash vaporization.

Although mechanical crimping or soft soldering are prevalent techniques of securing wire terminations, there has been in the last several years a significant increase in the application of fusing and welding techniques for this purpose. Generally, fusing is preferred over welding when joining low resistance metals or when it is desired to hold distortion of the connected parts to a minimum.

The terms fusing and welding as used throughout this patent application have different meanings.

Resistance welding, as used in this patent application, results from passing current through the assembled terminal and wire to internally heat the metal parts to their plastic state and then forging the softened parts together. The electrical resistance of the parts determines the time and current necessary to soften the parts, and this resistance must be higher than the resistance of the welding electrodes. Electrode pressure in this process is such that it will not eliminate all of the surface electrical resistance between the parts and the electrodes. Care is taken to apply only enough pressure to accomplish forging. The nature of the resistance welded joint is that the softened zones of the parts have comingled and amalgamated into an integral bond.

Fusing, on the other hand, as used in this patent application, produces a compression joint in which the parts are held by a surface adhesion contact. In fusing, one and sometimes (in the case of opposed electrodes) both electrodes have a higher electrical resistance(s) than the parts being fused, so that the electrode can act as a heat source to the assembled parts. Power requirements are set so that the electrode-dissipates heat into the assembly to soften the parts without causing them to reach their plastic state. Electrode pressure is applied to thereupon force the softened parts together to form the compression joint as stated. In the compression joint, only about 0.0002 inch of the surface depth is affected with no amalgamation of metals.

Therefore, "fusing" in this patent application means a type of pressure heating that results at the joint primarily in a surface adhesion mechanical bond and not primarily in an amalgamation of molten contacting metals.

For a further detailed description of each of these techniques and the merits and uses of each, see "Commutator Fusing" by Allan Warner, I.E.E.E., Publication Number 69033-EI, Paper Number 71C38 EI-34, Sept. 20, 1971.

In conventional fusing or resistance welding techniques of the type described, the electrical terminal can be formed of any suitable metal such as brass, nickel, nickel alloy, steel, copper, copper alloy, gold, silver or other precious metals and their alloys. Lead wires are normally copper, gold, silver or their alloys. However, difficult problems are encountered when aluminum or aluminum alloy wires are used as part of the assembly. Specifically, unlike the aforementioned suitable metals, the softening points of aluminum and aluminum alloy wire are so low that the necessary heat applied to the assembly to flash vaporize the insulation or sufficiently soften the tang also softens the aluminum wire such that application of even slight pressure to the tang severs or unduly squeezes the softened wire like melted butter. Even if the wire is not severed during fusing, its cross section is so reduced that, upon cooling, it lacks even the minimum strength or cross section for a suitable electrical connection. Because of this characteristic, the use of fusing or resistance welding techniques for aluminum or aluminum alloy wire to tang type terminals or tang type commutators, have been avoided. One attempted solution has been to utilize a specially designed welding or fusing head with a relief therein aligned with the intended wire location. In this way less pressure is applied to the area of the tang aligned with the wire than to the other parts of the tang. However, this solution is neither technically practical nor economical since the fusing electrode is normally made of tungsten (an expensive material) and the edges of the relief wear considerably with use. Also, the specially designed electrode would not have general application and would have to be changed depending upon the nature of the wire material to be connected.

The present invention solves these problems and now facilitates for the first time fusing the electrical terminations of insulated or uninsulated aluminum wire without the risk of unduly weakening or undermining the strength of the wire or the integrity of the termination. Such termination is formed by the use of conventional fusing electrodes.

It is, therefore, a principal object of the invention to provide an electrical terminal that solves the problems and provides the advantages as described above.

SUMMARY OF INVENTION

Broadly, the invention prevents shearing of softened wire during a fusing process by providing an excess mass or enlargement as part of the cummutator segment or terminal that cooperates with the tang to take up or absorb part of the mechanical fusing pressure that would otherwise sever the heated softened wire. The size, shape and location of this enlargement introduces a further degree of control over the magnitude of pressure imparted to the heated wire. Consequently, heat and mechanical pressure can be applied to fuse the tang type terminal and join the insulated or uninsulated wire without severing or unduly weakening the wire even though the latter is heated to its plastic state.

Although the present invention affords technical benefits in fusing electrical leads of any general utility and dimension, terminals according to the invention have particular advantages and use in fusing magnet wire. Therefore, the principal concepts of the invention shall be disclosed herein by the example of fusing magnet wire to commutator terminals or bobbincoil terminals; however, it will be understood that the invention has other applications as well. Furthermore, the example shall disclose one lead wire joined to the terminal; however, it will be appreciated that the invention also applies to the termination of more than that number. The lead wire may include solid core or multi-strand wire as desired although only solid core is shown. Insulated or uninsulated wire may be used as desired.

DESCRIPTION OF DRAWINGS

FIGS. 10, 11, and 12 are plan, section and perspective views of a typical bobbin coil terminal in accordance with the invention, the view of FIG. 11 being taken along line 11—11 of FIG. 10.

DETAILED DESCRIPTION

Figure 1:
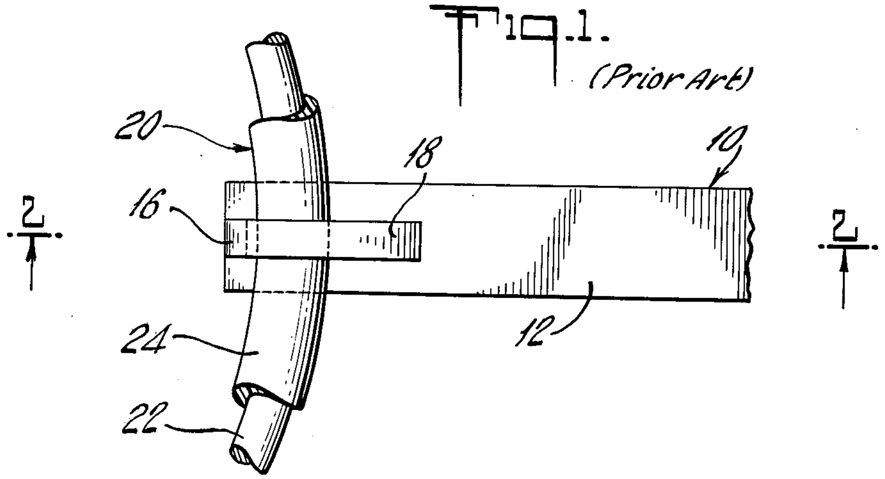
Fig. 1. (Prior Art)
FIG. 1 is a diagrammatic partial plan view of one form of a conventional commutator terminal and insulated wire assembly.
Figure 2:
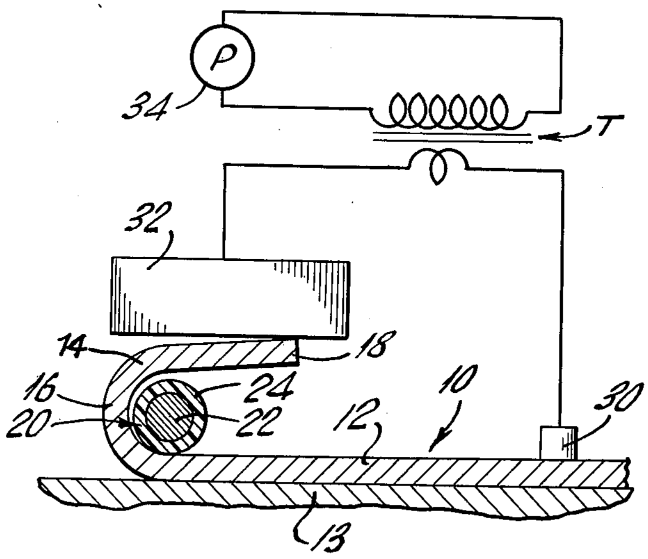
Fig. 2. (Prior Art)
FIG. 2 is a sectional view taken along line 2—2 of FIG. 1 and also includes a schematic representation of the electrodes and power supply used in the fusing process.

With reference to FIGS. 1 and 2 there is illustrated part of a conventional commutator terminal 10 which typically includes a body 12 and free standing projection 14, commonly termed a "tang". Body 12 is supported on preferably a non-conducting support 13 to cooperate with the fusing heads as described below. As best seen in FIG. 2, tang 14 has an interconnection part 16 upstanding from body 12 and a free end or finger 18 extending away from part 16 so as to form a "U" shape, in profile, in cooperation with body 12. The tang and body can be formed of any suitable conductive material such as nickel, copper, brass or their alloys or gold or silver or their alloys.

Insulated conductor wire 20 is wrapped so as to extend across the body 12 near the upstanding part 16 of the tang. The insulated wire comprises a central electrically conductive core 22 and an outer sheath of insulation 24 that may be vaporized or consumed by the application of heat. For commutator leads, core 22 may be formed of copper, brass, gold, silver or their combined alloys and the insulation 22 may be one of the standard polymides, polyesters, polyvinyls, nylon, rubber or the like. If desired, bare solid or stranded wire can be used.

When the assembly is ready for fusing, a first low resistance electrode 30 is arranged to engage the body 12 of the terminal and high resistance electrode 32, that serves as a heat source to the assembly, engages the free end 18 of tang 14. This arrangement of electrodes is called "series"; however, an "opposed" arrangement can also be used where electrode 30 is replaced by a high resistance electrode (not shown) in contact with body 12 and facing electrode 32. The electrodes 30 and 32 are connected to a source of electrical power 34 through transformer T. It will be understood that the fusing apparatus is well known and need not be disclosed in further detail. See, for example, U.S. Pat. No. 3,045,103.

Figure 3:
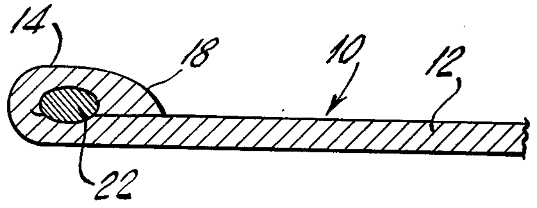
Fig. 3. (Prior Art)
FIG. 3 is the same view as FIG. 2 illustrating the fused wire and terminal connection.

To fuse the parts together and form the electrical connection, power source 34 activates electrodes 30 and 32 so that the current path is completed through body 12 and tang 14. Electrode 32 heats quickly and, under control of apparatus not shown, simultaneously drives the free end of tang 14, toward body 12. This action compresses tang 14, body 12 and insulated wire together and simultaneously heats the compressed parts sufficiently to burn off or consume insulation 24 and expose the wire core 22 to direct contact with the tang and body. The amount of current through the parts and the heat generated by electrode 32 is sufficient only to soften the parts to a degree at which the metal loses its memory as described above. Electrode 32 continues to build pressure up to a limit so that the engaging surfaces of tang 14 and body 12 together with the exposed metal core 22 are driven together to expell all voids or air spaces and to compress the engaging surfaces into a surface adhesion and compression bonded joint. Free end 18 also fuses to the engaging part of body 12. FIG. 3 illustrates the fused terminal and bonded metal core 22.

In a typical operation of fusing Number 28 (American Wire Gauge) copper magnet wire to a ⅞ inch diameter commutator, 5000 watts of electrical power are applied to heat tang 14 and wire core 22 for approximately 80 milliseconds in order to burn insulation 24 to sufficiently expose core 22. Larger wire dimensions and commutator sizes require similar increases in power and time applications to reach the desired temperatures, while smaller wire dimensions require decreases in these parameters. These relationships are well known in the art.

As stated above, metal core 22 of wire 20 may be any suitable metal; however, serious problems arise when aluminum or aluminum alloy or copper clad aluminum is used in the assembly of FIGS. 1–3. During the fusing operation when the parts are heated by electrode 32 to the extent and time necessary to burn off insulation 24 or soften the tang, the aluminum or aluminum alloy core 22 is also heated to the point of reaching its plastic state. Upon compression by electrode 32 to fuse free end 18 to body 12, tang 14 severs or unduly reduces the cross section of the softened zone of wire 22. The strength of lead wire 20 is then insufficient to hold to terminal 10 the mechanical connection for either or both segments of wire 20.

Figure 4:
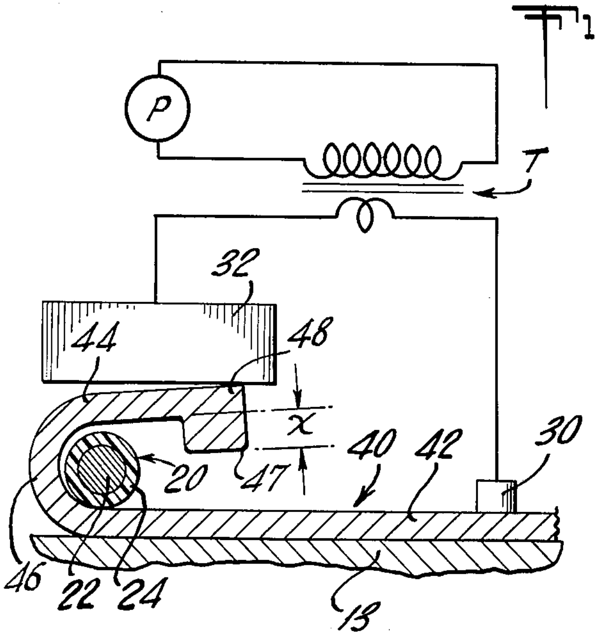
FIGS. 4 and 5 are the same views as FIGS. 2 and 3, respectively, illustrating an assembly and terminal according to the present invention.
Figure 5:
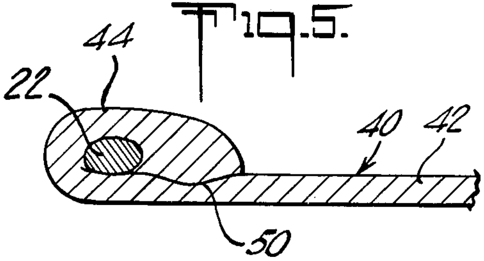

With reference to FIGS. 4 and 5, one embodiment of the present invention includes a terminal 40 having a body 42 and free standing tang 44 encompassing the wrapped wire 20. Tang 44 includes an interconnecting part 46 connected to body 42. According to the invention, the free end of the tang 44 is provided with an enlargement 47 extending from the free end 48 of tang 44 toward the body 42 of the terminal. The profile of the enlargement can be any suitable shape, for example, semicircular or rectangular, as shown. The enlargement is preferably swedged or cold forged while the entire terminal is being made. The preferably width (not shown) of enlargement 47 approximates the width of tang 14 and its dimension "X" is preferably selected to allow a controlled degree of deformation of the cross section of core 22 during fusion. For example, in the case of aluminum or aluminum alloy wire whose diameter is greater than number 28 (A.W.G.), the depth or "X" dimension may approximate ¾ of the diameter of metal core 22, and for wire sizes whose diameter is less than number 28 (A.W.G.), the depth of "X" dimension may be approximately equal to or greater than the diameter of the metal core 22. The relations relation of these relationships are determined by practical manufacturing considerations. In this way, the mechanical pressure imparted to the heated aluminum wire core 22 during fusing is controlled to allow slight deformation (for example, 30% reduction) of the cross sectional area of core 22. See FIG. 5. Slight deformation is defined as reduction in cross sectional area which is insufficient to unduly weaken the wire or significantly change its electrical resistance.

During the fusing operation, active electrode 32 imparts heat and pressure to the assembled parts as shown. The wire core may soften but will not flow unless excessively pressured by tang 44. As electrode 32 drives tang 44 toward the body 42, enlargement 47 engages the body to take up or control the mechanical head pressure which would otherwise be imparted to the heated core 22 by tang 44. Since the conventional apparatus (not shown) driving electrode 32 is pressure limited (see for example U.S. Pat. No. 3,045,103) and enlargement 47 takes up or accounts for a major part of the pressure, only slight deformation of core 22 results. Upon cooling, a fused joint is formed at 50 and the complete circumference of exposed core 22 is joined to the surrounding tang and body of terminal 40 by surface adhesion.

FIG. 5 shows the fused joint and bonded metal core 22 which has undergone a controlled amount of deformation.

Figure 6:
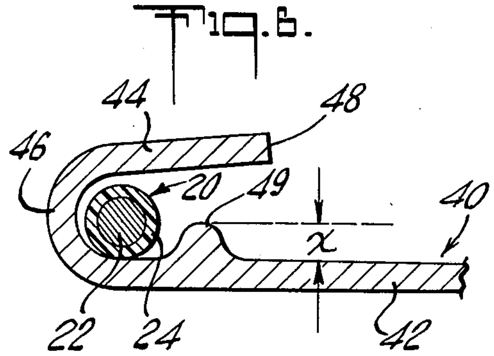
FIGS. 6 and 7 are the same views as FIGS. 4 and 5 illustrating another embodiment of the invention.
Figure 7:
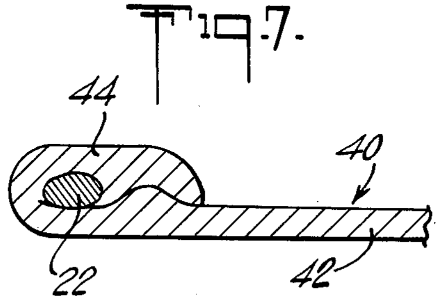

Another embodiment of the invention is illustrated in FIGS. 6 and 7 which includes terminal 40 having a body 42 and tang 44 encompassing insulated wire 20. According to the invention, an enlargement 49 projects from the body 42 toward the free end 48 of tang 44. The width (not shown) of enlargement 49 should approximate that of tang 44. Again, the dimensions and mass of enlargement 49 can be selected to control the mechanical pressure imparted to the wire core during the fusing operation. FIG. 7 depicts the completed fused connection and joint.

Figure 8:
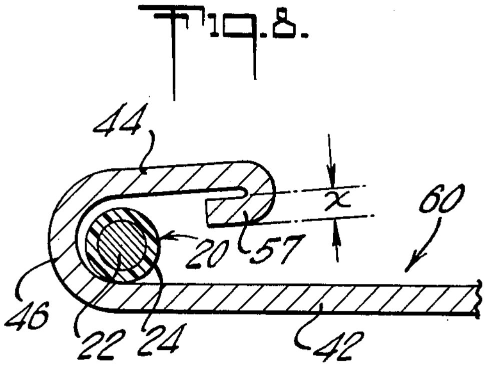
FIGS. 8 and 9 are the same views as FIGS. 4 and 5 illustrating a still further embodiment of the invention.
Figure 9:
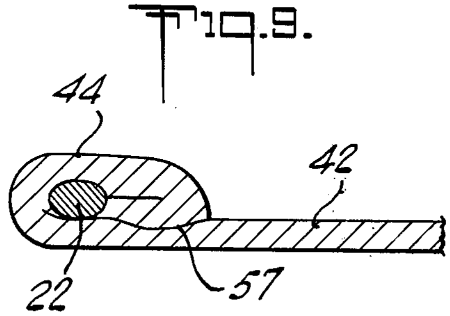

A further embodiment of the invention is shown in FIGS. 8 and 9 in which the enlargement 57 is formed on tang 44 by bending the free end thereof inward toward the interconnecting part 46. The degree of bend of the free end must be sufficient to prevent the end from turning in a direction away from part 46 upon application of heat. If the free end were bent at right angles to the plane of body 42, the application of heat would cause the enlargement 57 to extend toward the body 42 but at an angle greater than 90° to the finger of tang 44. With the bend as shown in FIG. 8, the bend is greater than the elastic limit when the tang is heated and there is less tendency for the enlargement to swing out of the location beneath the tang. Consequently, enlargement 57 functions to control the pressure imparted to the wire core as described for the above-mentioned embodiments. FIG. 9 shows the completed fused joint.

For the terminal in FIGS. 10, 11 and 12, tang 46 is arranged at right angles to the axis of body 42 and may be located at one end thereof as shown. Enlargement 47, having a predetermined "X" dimension as described, extends from finger 48 toward body 42. Insulated stranded wire 20 is held within tang 46. A pair of high resistance opposed electrodes 32 and 33 are arranged respectively above and below tang 46 and body 42. Alternatively, a series electrode arrangement (not shown) may be used. Upon application of power and pressure, tang 46 is heated and the parts are squeezed together. Insulation 24 is vaporized and the contacting metal surfaces are bonded together generally as shown in FIG. 12. Enlargement 47 controls the pressure imparted to the heated wire as described.

It will be appreciated that other and further modifications can be made without departing from the spirit and scope of the invention.

What is claimed is:

1. A method of fusing conductor wire that includes aluminum or aluminum alloy to a tang type terminal having an inter-connected body comprising positioning at a designated wire position within the tang insulated wire that includes aluminum or aluminum alloy; heating the tang, body and wire with a fusing electrode enough to soften the tang beyond its metallic memory and to burn away insulation on the wire to expose the surface thereof but not enough so that the tang reaches its plastic state and concurrently applying pressure to the tang to join the tang to the body and to join the wire thereto by a thermocompression surface adhesion contact; and controlling that portion of the pressure applied to the wire when softened so that the pressure applied to the wire is insufficient to sever or excessively reduce the cross-section of the wire; and wherein said step of controlling the pressure comprises positioning an enlarged mass of terminal material between the tang and body and opposite from the inter-connection relative to the designated wire position prior to said heating step and spacing said mass from one of said tang and body such that said mass engages both said tang and body during said pressure-applying step.

2. An article made by the method of claim 1.

* * * * *